(12) United States Patent
Bye

(10) Patent No.: US 7,477,897 B2
(45) Date of Patent: Jan. 13, 2009

(54) METHOD FOR HANDOFF OF A TELEPHONE CALL BETWEEN TWO DIFFERENT WIRELESS NETWORKS

(75) Inventor: Rick Bye, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/780,160

(22) Filed: Feb. 17, 2004

(65) Prior Publication Data

US 2004/0233840 A1 Nov. 25, 2004

Related U.S. Application Data

(60) Provisional application No. 60/472,647, filed on May 22, 2003.

(51) Int. Cl.
*H04Q 7/20* (2006.01)
(52) U.S. Cl. .................. 455/436; 455/458; 455/67.11; 455/226.2; 455/552.1
(58) Field of Classification Search ............. 455/422.1, 455/432.1, 433, 435.1, 436–442, 456.1–456, 455/458
See application file for complete search history.

(56) References Cited

U.S. PATENT DOCUMENTS

| | | | |
|---|---|---|---|
| 6,320,534 B1 * | 11/2001 | Goss | 342/357.1 |
| 2002/0147008 A1 * | 10/2002 | Kallio | 455/426 |
| 2003/0114158 A1 * | 6/2003 | Soderbacka et al. | 455/436 |
| 2004/0090937 A1 * | 5/2004 | Chaskar et al. | 370/331 |
| 2004/0121774 A1 * | 6/2004 | Rajkotia et al. | 455/441 |
| 2004/0192341 A1 * | 9/2004 | Wang et al. | 455/456.1 |
| 2004/0218575 A1 * | 11/2004 | Ibe et al. | 370/338 |

* cited by examiner

*Primary Examiner*—Temica M Beamer
(74) *Attorney, Agent, or Firm*—Garlick Harrison & Markison; Bruce E. Garlick; Holly L. Rudnick

(57) ABSTRACT

A system and method with which to establish parallel communications between the wireless terminal and the PSTN via a WLAN and an alternative network such as cellular or satellite networks. Once the parallel communications are established, handoff criteria govern seamlessly switching communications between the WLAN and the alternative network in order to avoid any lost or dropped communications. Communications may be serviced between a Private Branch Exchange (PBX) and a wireless terminal. The PBX communicatively couples to a wireless local area network (WLAN). Calls received at the PBX for the wireless terminal are routed to the wireless terminal if the wireless terminal is serviced by the WLAN, otherwise an attempt is made to deliver the call via an alternative network. Should both deliveries fail, the call is delivered to an alternative destination such as voice mail or an operator.

36 Claims, 14 Drawing Sheets

METHOD FOR HANDOFF OF A TELEPHONE CALL BETWEEN TWO DIFFERENT WIRELESS NETWORKS

RELATED APPLICATIONS

This application claims priority of U.S. Provisional Application No. 60/472,647 filed May 22, 2003 entitled, "Method for Handoff of a Telephone Call between Two Different Wireless Networks" by Rick Bye, and is incorporated herein by reference in its entirety.

TECHNICAL FIELD OF THE INVENTION

This invention relates generally to wireless voice communications; and more particularly to servicing communications between a Call Control Entity, such as a Private Branch Exchange, and roaming wireless voice terminal(s).

BACKGROUND OF THE INVENTION

Communication technologies that network electronic devices are well known. Examples include: wired packet data networks; wireless packet data networks; wired telephone networks; and satellite communication networks, among other networks. These communication networks typically include a network infrastructure that services a plurality of client devices. The Public Switched Telephone Network (PSTN) is probably the best-known communication network and has been in existence for many years. The Internet, another well-known example of a communication network, has also been in existence for a number of years. Communication networks like these enable client devices to communicate with one another on a global basis.

Local Area Networks (wired LANs), e.g., Ethernets, support communications between networked computers and other devices within a serviced area. These wired LANs often link serviced devices to Wide Area Networks and the Internet. Each of these networks is generally considered a "wired" network, even though some of these networks, e.g., the PSTN, may include some transmission paths that are serviced by wireless links.

Wireless networks have come into existence more recently. Examples include cellular telephone networks, wireless LANs (WLANs), and satellite communication networks. Common forms of WLANs such as IEEE 802.11(a) networks, IEEE 802.11(b) networks, and IEEE 802.11(g) networks are referred to jointly as "IEEE 802.11 networks." In a typical IEEE 802.11 network, a wired backbone couples to a plurality of Wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol may also support ad-hoc networking in which wireless terminals communicates directly to one another without the presence of an AP.

WLANs now also support voice communications via wireless voice terminals. In supporting the wireless voice terminals, the WLAN works in cooperation with a Private Branch Exchange (PBX) to interface the WLAN with the PSTN. A serviced call is routed between the PSTN and a serviced wireless voice terminal via the PBX and the WLAN. The wireless voice terminal may roam anywhere within the service area of the WLAN and receive voice service. However, should the wireless terminal roam outside of the service area of the WLAN, the call will be dropped. Thus, a need exists for the ability to roam with a wireless terminal that can be handed off and be serviced outside of the coverage area of the WLAN.

SUMMARY OF INVENTION

This disclosure provides a system and method by which wireless terminals may roam beyond the boundaries of their parent WLANs. More specifically, this disclosure provides a system and method with which to establish parallel communications between the wireless terminal and the PSTN via a WLAN and an alternative network such as cellular or satellite networks. Once the parallel communications are established, handoff criteria govern seamlessly switching communications between the WLAN and the alternative network in order to avoid any lost or dropped communications.

One embodiment provides a method for servicing communications between a Call Control Entity (CCE), such as a Private Branch Exchange (PBX) or service provider, and a wireless terminal. The CCE communicatively couples to a wireless local area network (WLAN). When a call is received at the Call Control Entity for the wireless terminal a determination is made as to which network is currently serving the wireless terminal. If the wireless terminal is serviced by the WLAN, the call is delivered to the wireless terminal via the WLAN. If the wireless terminal is not being serviced by the WLAN, an attempt is made to deliver the call via an alternative network such as cellular. Should both deliveries fail, the call is delivered to an alternative destination such as voice mail or an operator.

This decision making process may involve determining the physical location of the wireless terminal relative to the coverage area of the WLAN and the coverage area of the cellular network. Once the location has been determined the call may be serviced by the WLAN when the wireless terminal is within the coverage area of the WLAN. Similarly, the call may be serviced with the cellular network when the wireless terminal is outside the coverage area of the WLAN but within the coverage area of the cellular network.

In one embodiment, this determination is made with Global Positioning Satellites (GPS) systems. The GPS position is then compared to the boundaries of the coverage area to determine which coverage areas encompass the location of the wireless terminal.

Another embodiment may examine the relative motion and location of the wireless terminal to boundaries of the coverage areas to decide how the call should best be serviced. For example, the call may be serviced by the WLAN when the wireless terminal is within the coverage area of the WLAN and is not predicted to leave this coverage area. Similarly, the cellular network may service the call when the relative motion of the wireless terminal is towards the boundaries of the WLAN's coverage area or the wireless terminal is predicted to leave the coverage area of the WLAN within a predetermined amount of time. This allows a handoff to occur prior to experiencing any dropped calls.

Another embodiment may choose to initiate a handoff between the servicing networks based on a comparison of the signal quality of the available networks. In examining the signal quality, one method may examine signals from numerous Access Points (APs) in the WLAN. Similarly, the position and motion of the wireless terminal may be determined by comparing signal strengths from a plurality of APs. Handoff decisions can be initiated by examining the time rate of change of the signal and executed before the signal strength falls below a predetermined threshold.

By examining the signal quality of all available networks and establishing a set of hand off rules, call servicing can be handed off based on many factors such as signal quality, available bandwidth and cost. The rules may further limit the number of actual hand offs by having different threshold levels for initiating a hand off to an alternative network and returning the service to the original network.

Another embodiment provides another method for servicing communications between a wireless terminal and a wireless local area network (WLAN) or other alternative network. In this method, the signal quality associated with the servicing network, typically the WLAN, is compared to a series of handoff thresholds.

Parallel communication path(s) to the wireless terminal via the alternative network(s) are established to service the call when the available signal quality drops below the first threshold. The call transfers to the alternative network when the signal quality fails to meet a second handoff threshold. After transferring service, the communication path between the wireless terminal and the WLAN may terminate when the signal quality drops below a second threshold. Alternatively, servicing the call may return to the original network when the signal quality increases above the first handoff threshold. At which time, the communication path between the wireless terminal and the alternative network may be terminated.

Hand off or servicing decisions may also be based on the location of the wireless terminal relative to a coverage area of the available networks. In such a case, when the location of the wireless terminal is within the coverage area of a preferred network, the preferred network services the call. The alternative network should service the call when the wireless terminal is within the coverage area of the alternative network(s) but outside the coverage area of the Primary Network. The alternative network(s) may include cellular networks, satellite based networks or other such networks known to those skilled in the art.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

Figure 1:
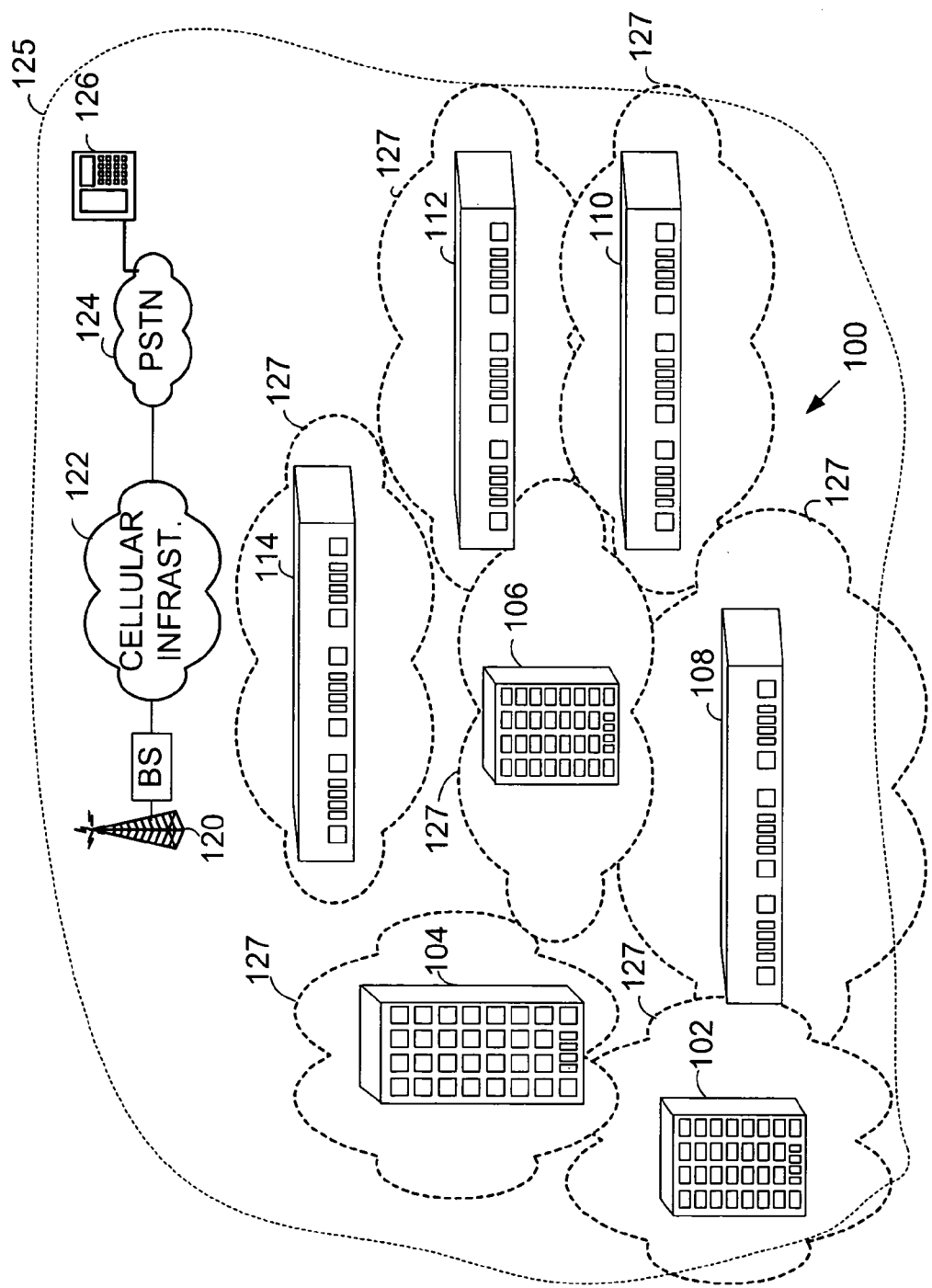
FIG. 1 is a system diagram illustrating a premises in which a Wireless Local Area Network (WLAN) is deployed.

FIG. 1 provides system diagram of campus 100 in which Wireless Local Area Networks (WLANs) are deployed. Campus 100 includes office buildings 102, 104, 106 and industrial buildings 108, 110, 112, and 114. Premises 100 may correspond to a company such as a technology company, a seller of goods, a service company, or another type of company. Contained within each of the office buildings 102, 104, and 106 are a number of offices, each of which provides a working space for employees to work. Each of the industrial buildings 108, 110, 112, and 114 also may provide space for manufacturing, storage, and/or other purpose(s).

Contained within each of these buildings 102-114 are computer workstations, computer servers, printers, FAX machines, phones, and other electronic devices. Each of these electronic devices has its own communication requirements. For example, computer workstations, computer servers, and printers each require data communication service. Such data communication service requires that the devices can communicate with other devices located within the premises 100 and with devices located external to the premises 100 across one or more data networks. The FAX machines and phones require coupling to one another and to the Public Switched Telephone Network (PSTN).

WLANs 127 within each of the buildings 102-114 and elsewhere within the campus may facilitate data communications. WLAN(s) 127 may support next generation WLAN devices, e.g., IEEE 802.11(g) devices as well as legacy WLAN devices, e.g., IEEE 802.11(b) devices, in a single shared spectrum, e.g., the 2.4 GHz ISM band.

FIG. 1 also illustrates a portion of a cellular network that includes a base station 120, a cellular network infrastructure 122, the Public Switched Telephone Network (PSTN) 124, and a telephone(s) 124. Coverage area 125 of the cellular network typically overlays the service area of WLAN(s) 127. A WAN 129 may link WLANs 127. A wireless terminal, serviced within the WLAN, typically is also within a coverage area 125 of the cellular network. However, overlapping coverage of the WLAN(s) may eliminate the need for wired connectivity, allowing the WLANs to interface wirelessly. This overlap allows calls to be seamlessly transferred between the WLAN, and the cellular network. The calls serviced may include incoming, outgoing, and hand-off calls. A better understanding of the manner in which these operations are accomplished will be gained by the following description made with reference to FIGS. 2-7.

Figure 2A:
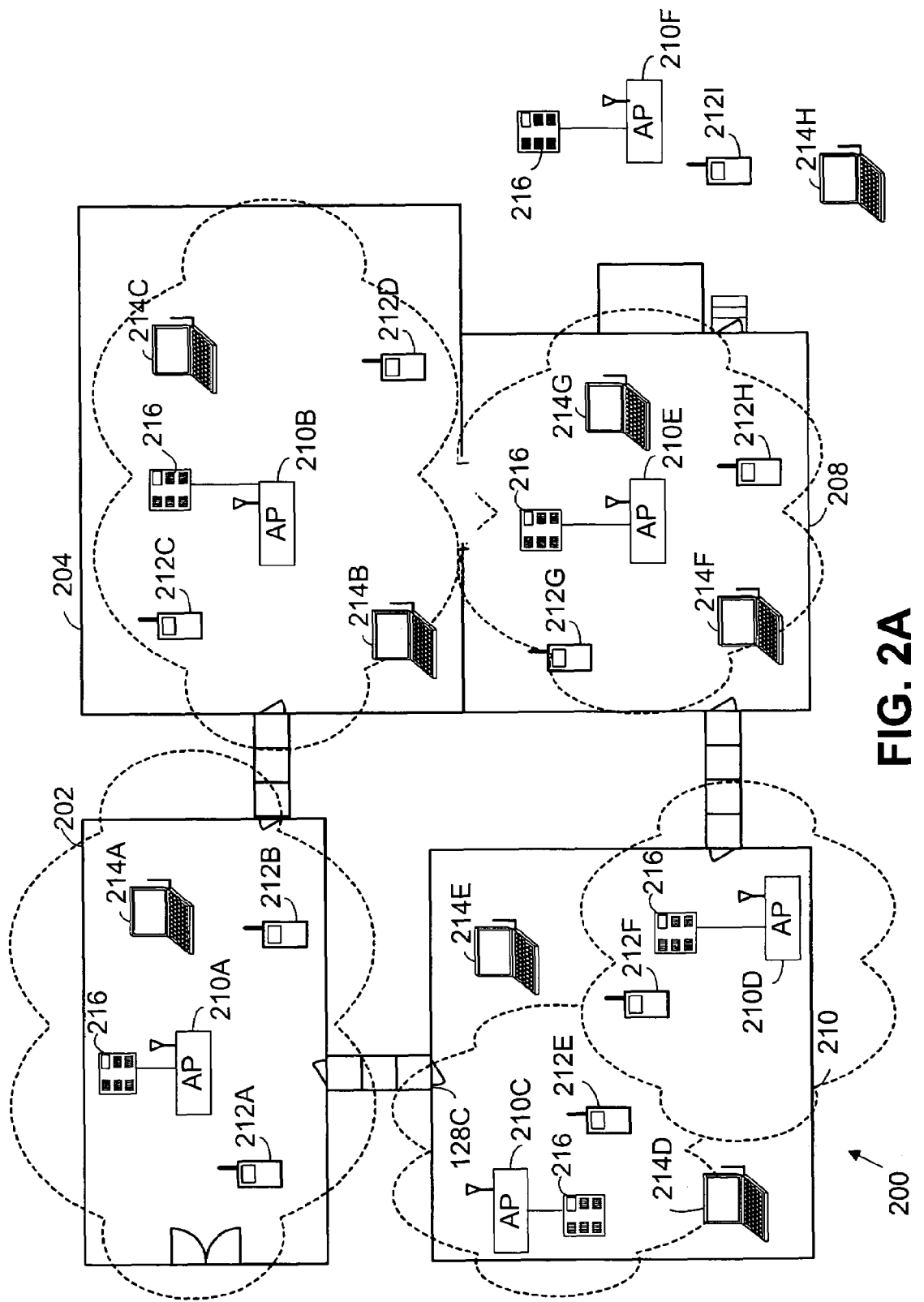
FIG. 2A-2C provide partial system diagrams illustrating a portion of the campus of FIG. 1 in which wireless communications are serviced.

FIG. 2A depicts a portion of campus 100 of FIG. 1 in which calls to wireless terminals are serviced. A building floor 200, shown in FIG. 2A, may be a lower floor of one of the buildings of FIG. 1, e.g., building 102. The building floor 200 includes a plurality of rooms 202, 204, 206, and 208. Each of these rooms 202, 204, 206, and 208 has placed therein Wireless Access Points (APs) 210A, 210B, 210C, 210D, and 210E, respectively, that service corresponding areas. Further, an external AP 210F services an area external to room 208 of building floor 200. Each of these APs 210A-210F couples to a wired network infrastructure that may include a building router 216.

Serviced within the building floor 200 are wireless telephones/data terminals 212A-212I and laptop computers 214A-214H, together "wireless terminals" or stations (STAs). Each of these wireless terminals communicates with a servicing AP. For example, laptop computer 214A and wireless terminals 212A and 212B wirelessly communicate with AP 210A (in their illustrated positions). Each of the APs 210A-210E supports wireless communications primarily within a designated area. However, the coverage area of each AP 210A-210E may extend beyond the boundaries of the serviced rooms 202-208 so that overlapping coverage areas exist. For example, APs 210A and 210C provide service between rooms 202 and 206 so that wireless terminals that roam between the rooms continue to receive wireless communication service when traveling between the rooms 202 and 206. Further, AP 210F supports wireless communications outside of floor 200 to service laptop computer 214H and wireless terminal 212I. Some or all of the STAs may also support ad-hoc networking in which they communicate directly, without AP interaction.

Figure 2B:
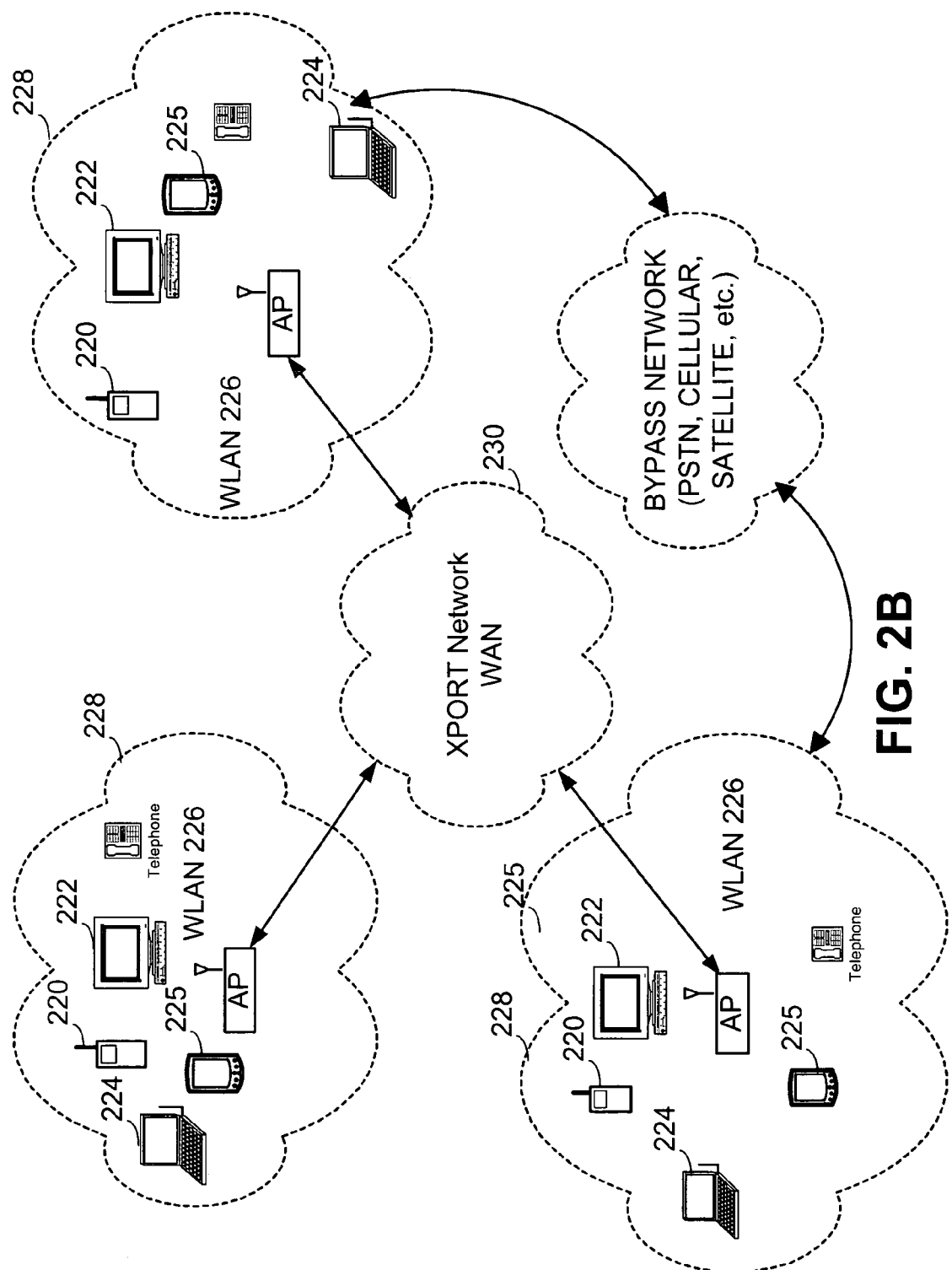

FIG. 2B depicts numerous wireless terminals, such as handsets 220, desktop computers 222, laptop computers 224, communicatively coupled to WLAN 226. Each WLAN has a given coverage area, which may or may not overlap with the coverage areas of other wireless local area networks 228. It is possible for wireless terminals 220, 222 and 224 and 225 to roam between wireless local area networks 226 and their coverage areas 228. A backbone or transport network 230 may communicatively couple the individual wireless local area networks 226. In this way, wireless terminals within the covered area of a first wireless local area network, can communicate to other wireless terminals within other networks. A processor will regulate the data flow and communications between WLANs 226 to ensure that communications requiring real time transmissions, such as voice communications or other multi-media applications take priority and potentially delay communications having lower priorities. Alternatively, the processor may direct that should the backbone of the WAN be unable to support the bandwidth requirements of the real time communications, those communications may be routed through an alternative network, such as the PSTN, cellular network, a satellite communications network, or any other like network known to those skilled in the art.

Figure 2C:
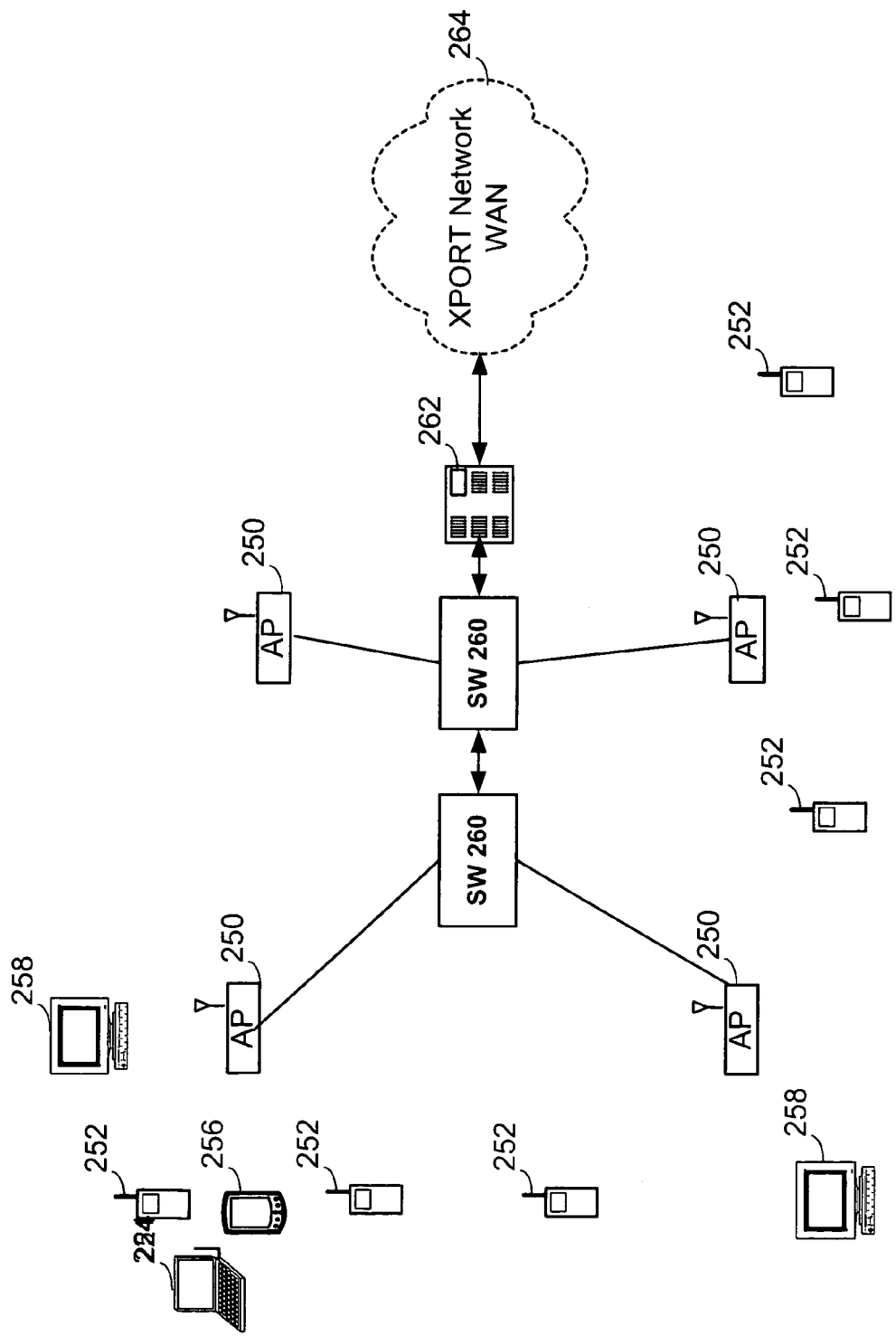

FIG. 2C depicts a WLAN having a plurality of access points 250 used to communicate with wireless devices such as handsets 252, PDAs 254, laptop computers 256, desktop computers 258, and other like devices as known to those skilled in the art. Switches 260 allow connections between the various APs 250 to transport network 264 via gateway 262. As previously stated, communications between the various wireless devices are received by an access point and routed through switches 260 and gateway 262 to a transport network 264, should a communication path need to be established between wireless terminals in diverse wireless local area networks.

Figure 3:
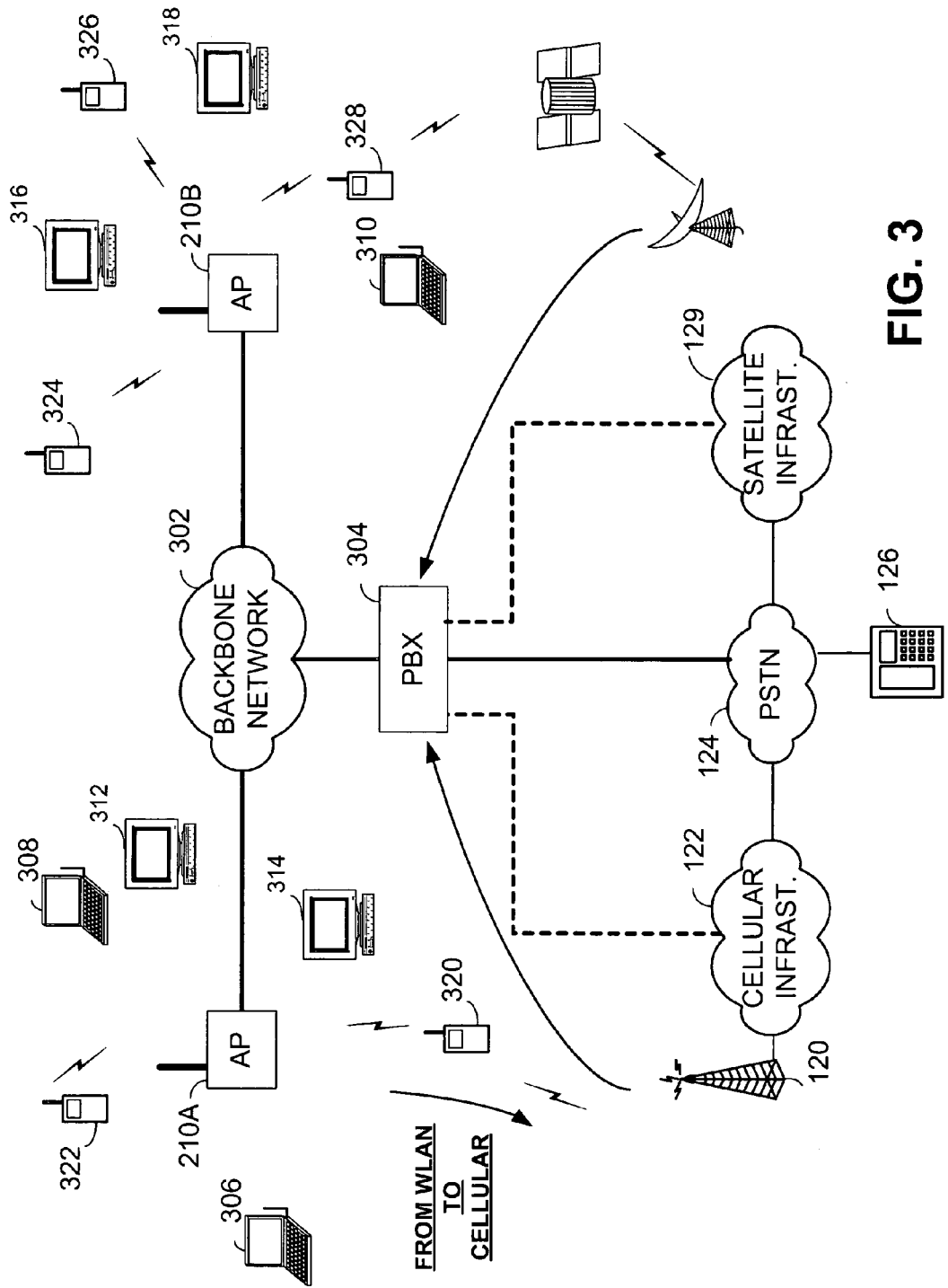
FIG. 3 is a partial system diagram of a WLAN and a cellular network.

FIG. 3 provides a partial system diagram illustrating a portion of the WLAN servicing the building floor of FIG. 2A. The WLAN of FIG. 3A supports at least one standardized operation having provisions for servicing voice communications, e.g., IEEE 802.11(a), IEEE 802.11(b), IEEE 802.11(g), etc. The portion of the WLAN shown includes APs 210A and 210B that support wireless communications within a serviced area, for example, the rooms 202 and 204 of FIG. 2. APs 210A and 210B couple to a wired backbone network 302. APs 210A and 210B service wireless communications for laptop computers 306, 308, and 310, desktop computers 312, 314, 316, and 318, and wireless telephones/data terminals 320, 322, 322, 324, 326, and 328. Note that while different numbering is used for the wireless terminals of FIG. 3, they are the same as, or similar to, wireless terminals of FIG. 2. Service areas supported by APs 210A and 210B partially overlap. The wired backbone network 302 couples to a Call Control Entity, such as Private Branch Exchange (PBX) 304. The PBX couples to the PSTN 124 and optionally may couple to an alternative network. These networks may include cellular infrastructure 122 or satellite infrastructure 129 or other like networks known by those skilled in the art.

PBX 304 services the wired voice communications for the premises. PBX 304 may employ packet switched or circuit switched operations, may support digital or analog operations, include advanced features such as voice messaging, and support incoming call servicing, outgoing call servicing, and wireless terminal roaming. PBX 304, in conjunction with WLAN backbone network 302 and the APs 210 and 210, may facilitate roaming operations between the WLAN and alternative networks 122 and 127. Roaming operations may begin prior to a wireless terminal leaving the coverage area of the WLAN or wireless terminal 328 entering the coverage area of the WLAN, during an ongoing call.

Figure 4A:
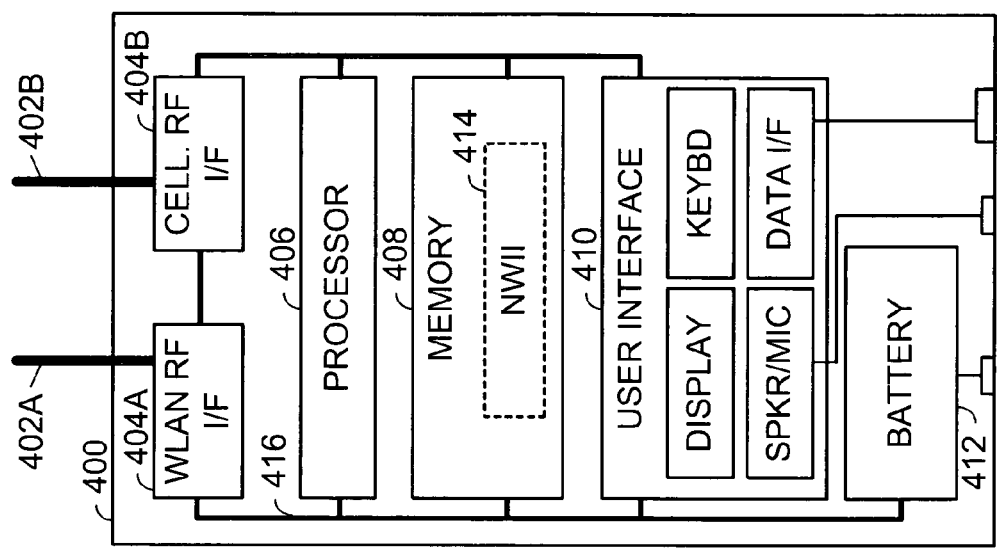
FIG. 4A-4E provide diagrams illustrating the embodiments of wireless handsets.
Figure 4B:
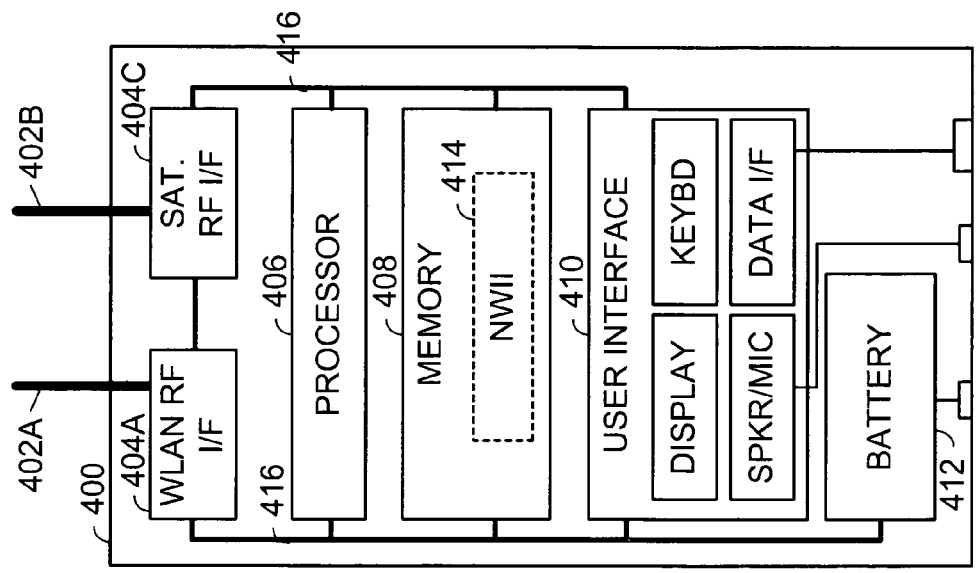
Figure 4C:
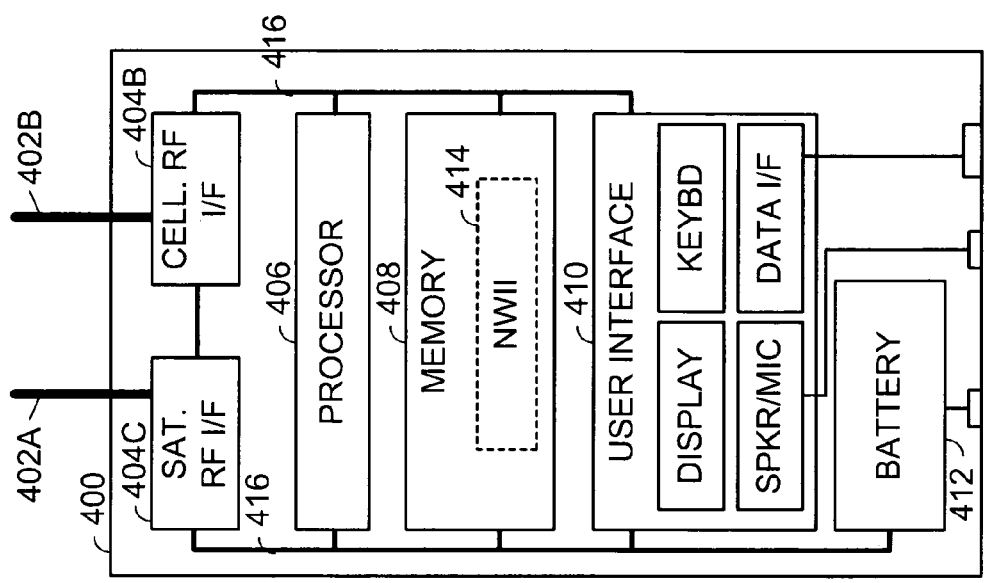
Figure 4D:
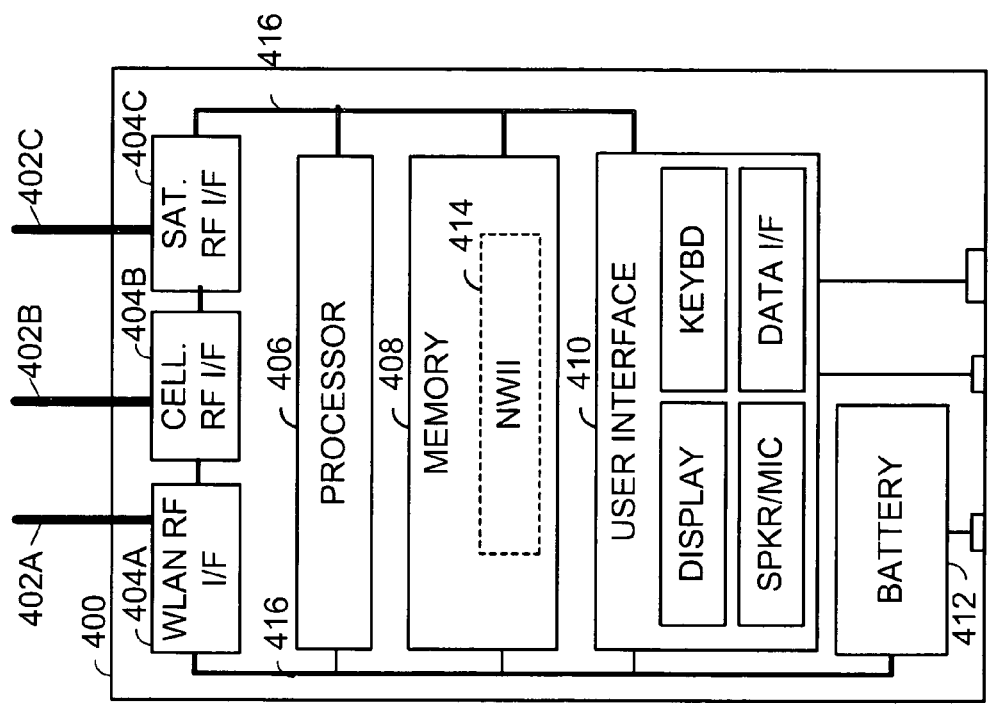

FIGS. 4A-4E provides block diagrams illustrating the typical components of various wireless terminals used according to this disclosure. FIG. 4A depicts wireless terminal 400 as having a WLAN RF unit 404A that supports wireless communications with the WLAN, and a cellular RF unit 404B that supports wireless communications with the cellular network. FIG. 4B includes a WLAN RF unit 404A and satellite RF unit 404C. FIG. 4C includes cellular RF unit 404B and satellite unit 4004C. FIG. 4D includes WLAN RF unit 404A, cellular RF unit 404B, and satellite RF unit 404C. RF units, 404A, 404B and 404C couple to antennas 402A, 402B and 402C respectively. These antennas 402A, 402B, and 402C may be located internal or external to the case of the wireless terminal 400. Further, in some embodiments, a single RF unit and/or a single antenna may support communications with both the WLAN and the cellular network. Processor 406 may be an Application Specific Integrated Circuit (ASIC) or another type of processor capable of operating the wireless terminal 400 according to this disclosure. Memory 408 includes both static and dynamic components, e.g., DRAM, SRAM, ROM, EEPROM, etc. In some embodiments, the memory 408 may be partially or fully contained upon an ASIC that also includes the processor 406. A user interface 410 includes a display, indicators, a keyboard, a speaker, a microphone, and/or a data interface, and may include other user interface components known to those still in the art. RF interfaces 404A, 404B, and 404C, processor 406, memory 408, and user interface 410 couple via one or more communication buses/links 416. Battery 412 or power port 418 couples to and powers RF interfaces, processor, memory and the user interface.

Figure 4E:
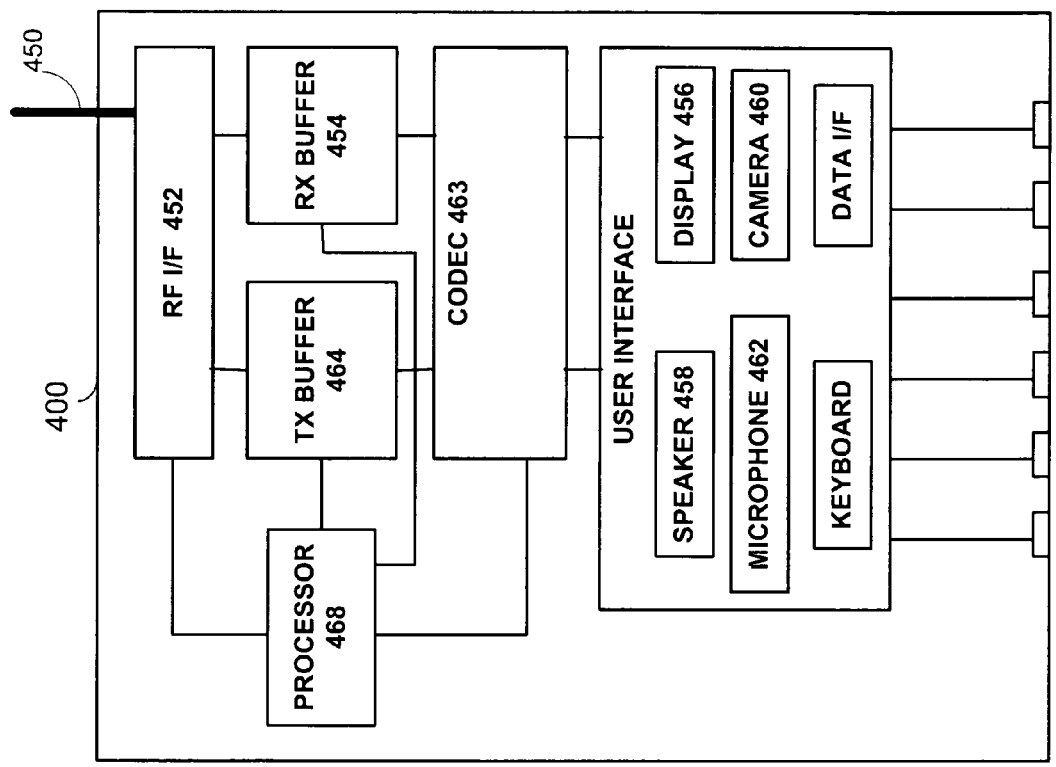

FIG. 4E provides a block diagram of a wireless terminal, which receives wireless communications through antenna 450. A wireless interface 452 allows the communications received through antenna 450 to be temporarily stored in a reception buffer 454 prior to being provided to a user, through a user interface, having a display and/or speaker. Similarly, camera 460 or microphone 462 may be used to take input from the user, which is coded, at CODEC 463 and provided to the transmission buffer 464. A microprocessor 468 may control the functions of the wireless interface with transmission buffer 464, reception buffer 454, and CODEC 463. Furthermore, the microprocessor may direct that the CODEC be adjusted, dependent on the traffic contained within the WLAN or any path between the transmitting wireless terminal and the communication's intended destination. By adjusting the CODEC, quality is adjusted up or down dependent on the available bandwidth contained within the weakest link in the communication pathway.

The embodiments of the wireless terminal 400 illustrated in FIGS. 4A-4E provide examples of wireless terminal configurations. Many other varied wireless terminal structures may be operated according to the teachings of the present invention.

Wireless terminal 400 may execute software instructions, i.e., Network Interface Instructions (NWII) 414. NWII 414 enable the wireless terminal 400 to establish parallel communications between various wireless networks and seamlessly switch the call's primary servicing network. NWII 414 load from memory 408 into processor 406 for execution. In other embodiments, these instructions may be based upon hardware function, firmware instructions, or a combination of any/all of these. Additionally, this functionality may be coordinated through an external processor.

Figure 5:
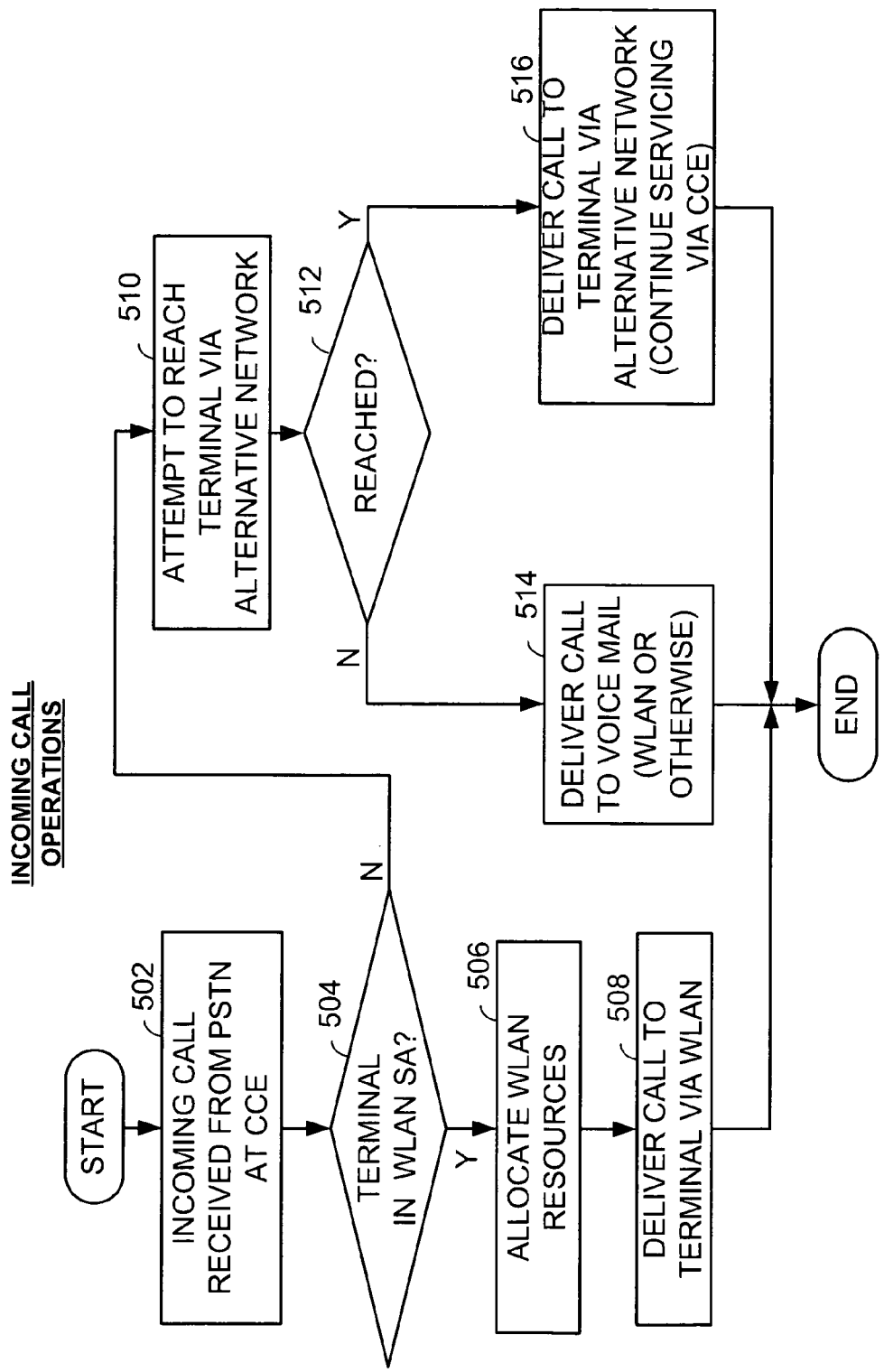
FIG. 5 provides a flow chart illustrating incoming call operations according to the present invention.

FIG. 5 provides a flow chart illustrating incoming call operations procedures as taught within this disclosure. Operation commences with an incoming call being received at the CCE from the PSTN (step 502). The CCE interacts with the WLAN to determine whether the destination wireless terminal is currently being serviced by the WLAN (step 504). If so, the CCE and the WLAN operate to allocate WLAN resources for servicing of the incoming call (step 506). The call is then delivered to the wireless terminal via the CCE and the WLAN (step 508).

When the wireless terminal is not serviced by the WLAN, an attempt to route the call via an alternative network is made at step 510. The alternative network may be a cellular network, e.g., a GSM cellular network, satellite network or other like network known to those skilled in the art. If communications are established with the wireless terminal at step 512, the call is delivered to the wireless terminal via the alternative network (step 516). Note that the CCE remains in the call routing path to service the call. Because of this, the originating terminal does not know whether CCE services the wireless terminal via a wired connection to the CCE, via the WLAN, or an alternative network such as a cellular network. Further, because of these operations, a calling party using phone 126, for example may reach the wireless terminal via a single phone number.

If communications with the wireless terminal cannot be established via the alternative network (as determined at step 512), the call may be delivered to voice mail (step 514) or another destination such as an operator. The call may be delivered to the voice mail of the cellular network where the CCE retrieves the voice mail. Alternately, the voice mail may be delivered directly to the voice mail serviced by the CCE, or to a voice mail server that services the CCE.

Figure 6:
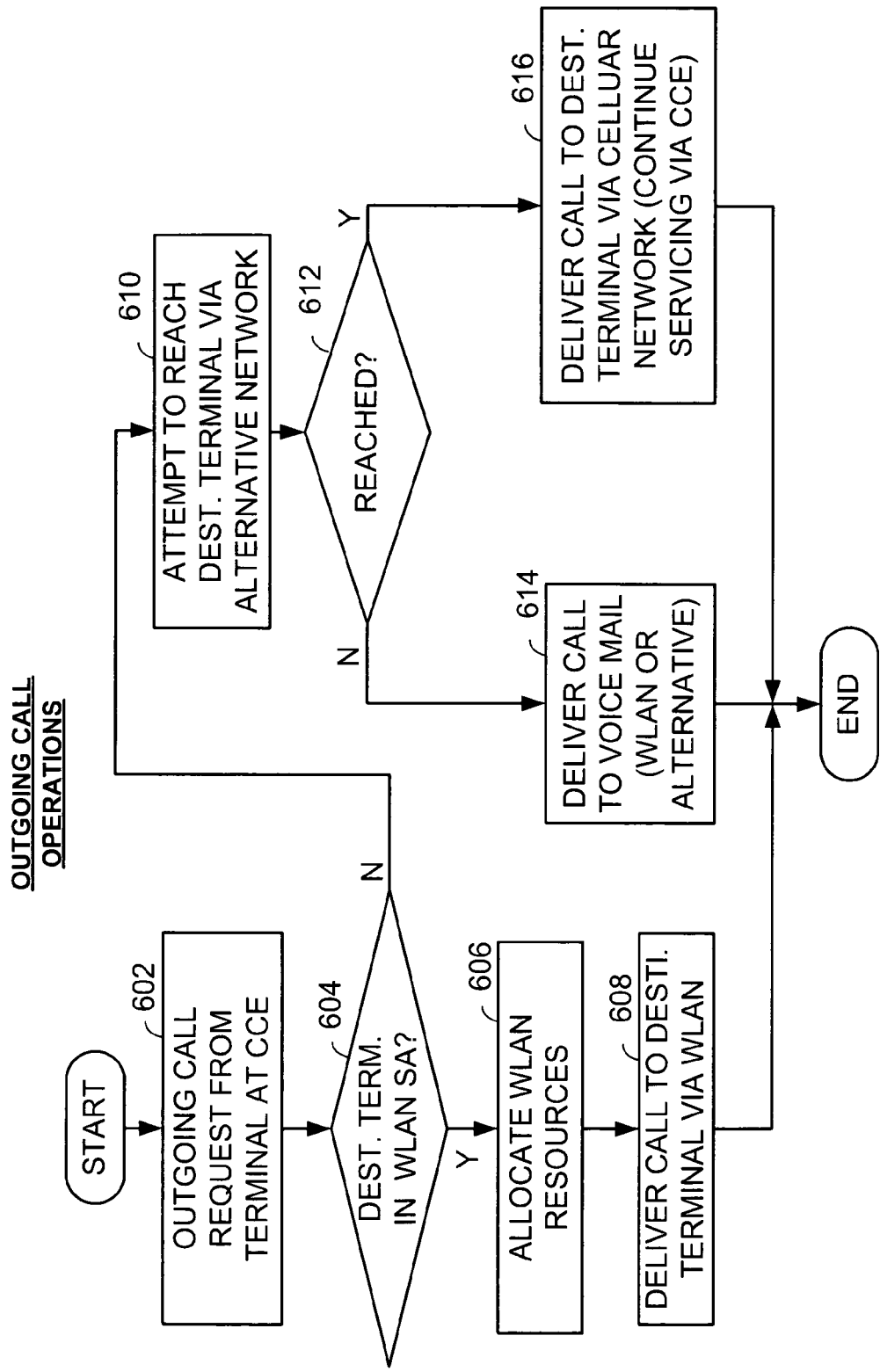
FIG. 6 is a flow chart illustrating outgoing call operations according to the present invention.

FIG. 6 provides a flow chart that depicts the services of an outgoing call. The CCE at step 602 receives an outbound call request from the wireless terminal. The CCE determines whether the destination terminal is a wireless terminal currently being serviced by the WLAN at step 604. If so, the CCE and the WLAN operate together to allocate WLAN resources to internally service the call at step 606. To allocate resources the WLAN may delay some communications having lower priorities. The call is then delivered to the destination wireless terminal via the CCE and the WLAN (step 608). When the outgoing call is not intended for a terminal serviced by the WLAN, the call is outwardly routed via the PSTN (operations not shown in FIG. 6).

When the destination wireless terminal is not currently being serviced by the WLAN, the Call Control Entity (in either a public or private environment), such as the PBX attempts to reach the destination wireless terminal via an alternative network such as cellular. If the wireless terminal can be reached (as determined at step 612), the call is delivered to the wireless terminal via the alternative network (step 616). As previously noted, the Call Control Entity, such as the PBX, remains in the call routing path when the destination is the wireless terminal. Hence, the originating terminal does not know whether the destination wireless terminal is serviced via a wired connection to the Call Control Entity, the WLAN, or an alternate network. If the wireless terminal cannot be reached via the alternative network(s) (as determined at step 612), the call is delivered to voice mail (step 614) or another extension. If the call is originating from the wireless terminal while being serviced by an alternate network, the Call Control Entity may not be in the call routing path. When the call is originated while the wireless terminal is operating from an alternate network, the wireless terminal may supply call identification information associated with the home Call Control Entity. Thus the call's destination does not know whether the originating wireless terminal is serviced via a wired connection to the Call Control Entity, the WLAN, or an alternate network.

Figure 7:
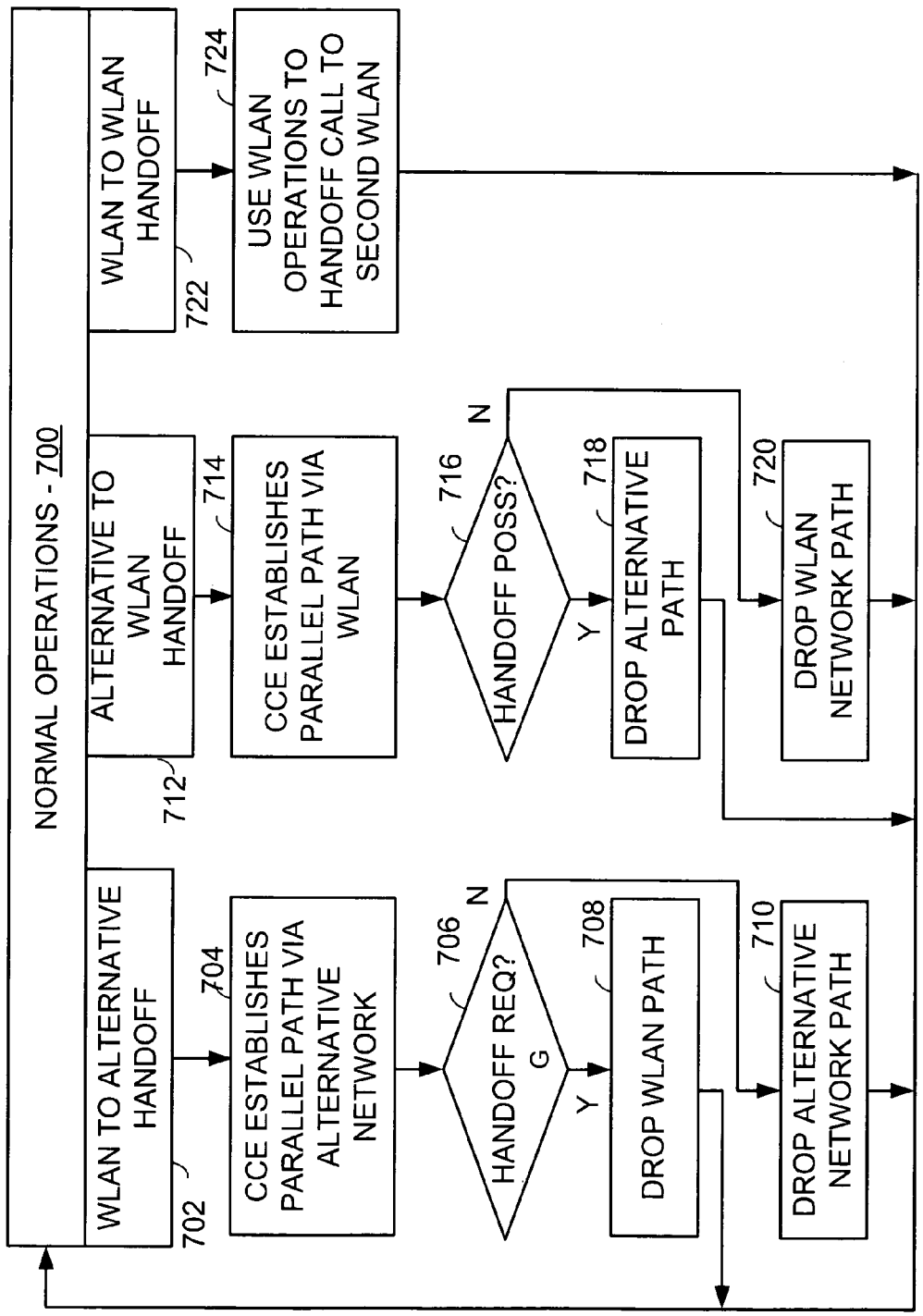
FIG. 7 is a flow chart illustrating handoff operations according to the present invention.

FIG. 7 depicts one embodiment of the hand off procedures. Normal call servicing does not require a handoff (step 700). However, when a handoff may be required, the system determines the required type of handoff. When WLAN to an alternate network handoff may be required (step 702), the CCE establishes a parallel communication path via the alternate network at step 704. Then, the CCE determines whether the handoff is actually required by monitoring the communication quality between the wireless terminal and the WLAN (step 706). The communication quality may be measured by considering the received signal strength at a servicing AP, the wireless terminal, by measuring the bit error rate at either the AP or the wireless terminal, or other method known to those skilled in the art. The determination may also be based on the location of the wireless terminal relative to the boundaries of the various network coverage areas. If handoff is required (as determined at step 706), the WLAN path of the parallel paths is dropped and servicing via only the cellular path is continued. If handoff is not required (as determined at step 706 by comparing signal quality to predetermined threshold levels) due to an increase in the communication quality as serviced by the WLAN, the cellular network communication path is dropped (step 710). From each of steps 708 and 710, operation proceeds to step 700.

Step 712 details an alternative network to WLAN handoff. Here the CCE establishes a parallel communication path via the WLAN at step 714. Then, the CCE determines whether handoff is possible from the alternate network to the WLAN by monitoring the communication quality, terminal location, and costs associated with the various pathways to the wireless terminal at step 716. The communication quality may be measured by considering the received signal strength at a potentially servicing AP or at the wireless terminal. If handoff is possible (as determined at step 716), the alternative network path of the parallel paths is dropped and servicing via only the WLAN path continues at step 718. If handoff is not possible (as determined at step 716) due to a decrease in the potential service quality by the WLAN, the WLAN communication path is dropped (step 720). From each of steps 718 and 720, operation proceeds to step 700.

Figure 8:
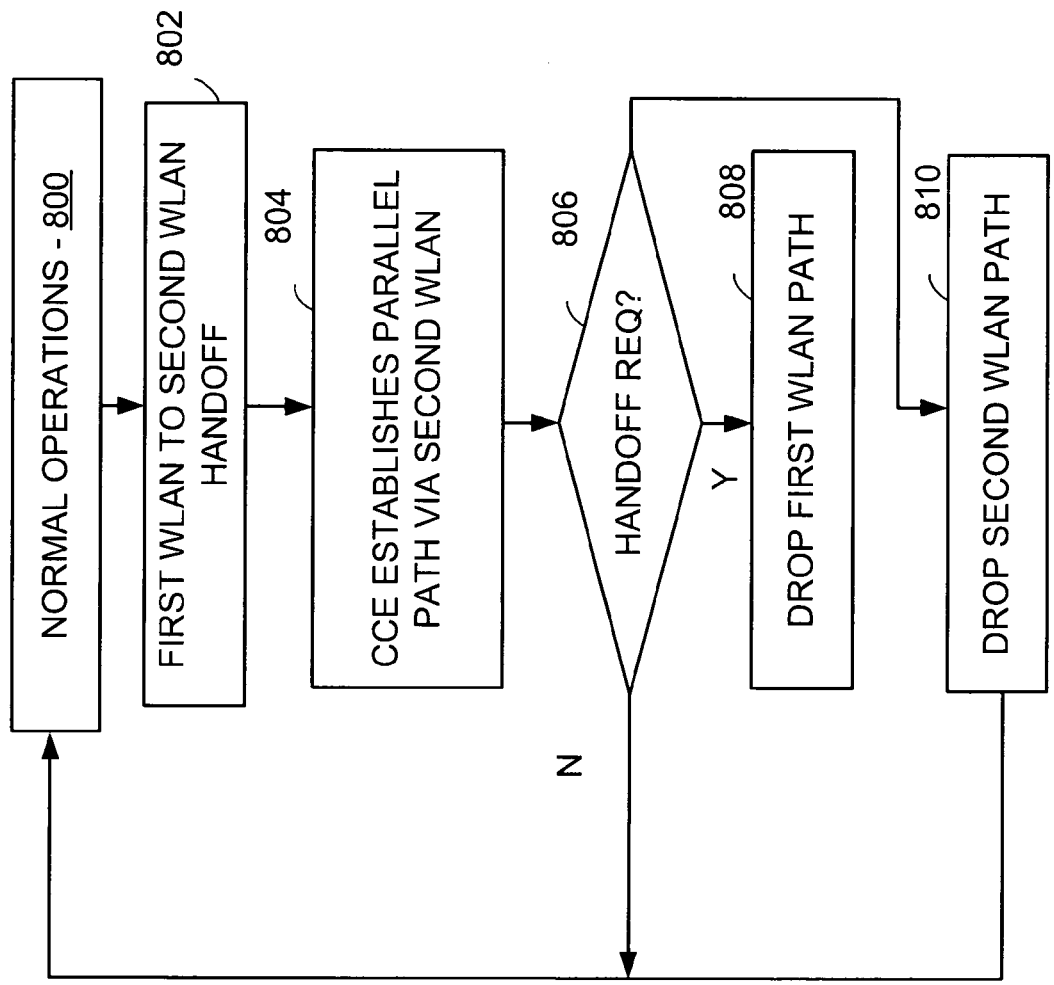
FIG. 8 is a flow chart illustrating handoff operations from WLAN to WLAN according to the present invention.

When WLAN to WLAN handoff is required (step 722) standardized WLAN handoff operations are performed to handoff the wireless terminal from the first servicing WLAN to the second servicing WLAN (step 724). Alternatively, similar procedures such as the WLAN to alternative network could be applied. FIG. 8 depicts one embodiment of the WLAN to WLAN hand off procedures. Normal call servicing does not require a handoff (step 800). However, when a handoff may be required, the system determines the required type of handoff. When WLAN to WLAN handoff may be required (step 802), the Call Control Entity establishes a parallel communication path via the second WLAN at step 804. Then, the Call Control Entity determines whether the handoff is actually required by monitoring the communication quality between the wireless terminal and the first WLAN (step 806). The communication quality may be measured by considering the received signal strength at a servicing AP, the wireless terminal, by measuring the bit error rate at either the AP or the wireless terminal, or other method known to those skilled in the art. The determination may also be based on the location of the wireless terminal relative to the boundaries of the various network coverage areas. If handoff is required (as determined at step 806), the first WLAN path of the parallel paths is dropped and servicing via only the second WLAN path is continued. If handoff is not required (as determined at step 806 by comparing signal quality to predetermined threshold levels) due to an increase in the communication quality as serviced by the first WLAN, the second WLAN path is dropped (step 810). From each of steps 808 and 810, operation proceeds to step 800.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

What is claimed:

1. A method for servicing communications from a Call Control Entity (CCE) to a wireless terminal, comprising:
   communicatively coupling the CCE with a wireless local area network (WLAN), the WLAN having a plurality of Access Points (APs);
   receiving at the CCE a call for the wireless terminal;
   determining the physical location of the wireless terminal relative to coverage areas of individual ones of the plurality of APs within the WLAN;
   allocating WLAN resources to service the call, when the wireless terminal is within a coverage area of one of the plurality of APs based on call servicing factors;
   delivering the call to the wireless terminal via the WLAN if:
      the wireless terminal is within the coverage area of one of the plurality of APs within the WLAN; and
      the call servicing factors allow the call to be serviced by the WLAN; or
   attempting to deliver the call to the wireless terminal via an alternate network based on the call servicing factors;
   wherein the call servicing factors include:
      a comparison of the signal quality of the WLAN and the signal quality of the alternate network;
      available bandwidth within the WLAN and the alternate network; and
      costs associated with servicing the call within the WLAN and the alternate network.

2. The method of claim 1, further comprising delivering the call to voice mail if the call cannot be delivered to the wireless terminal.

3. The method of claim 1, further comprising:
   determining the location of the wireless terminal relative to a coverage area of the alternate network;
   servicing the call with the WLAN when the location of the wireless terminal is within the coverage area of the WLAN and WLAN resources are allocated to service the call; and
   servicing the call with the alternate network when:
      the location of the wireless terminal is outside the coverage area of the WLAN but within the coverage area of the alternate network; or
      WLAN resources are not allocated to service the call.

4. The method of claim 3, further comprising determining the location of the wireless terminal with Global Positioning Satellites (GPS).

5. The method of claim 4, further comprising:
   determining a relative motion and location of the wireless terminal relative to a boundary of a coverage area of the WLAN;
   determining a relative motion and location of the wireless terminal relative to a coverage area of the alternate network;
   servicing the call with the WLAN when the location of the wireless terminal is within the coverage area of the WLAN; and
   servicing the call with the alternate network when:
      the relative motion of the wireless terminal is towards the boundary of the coverage area of the WLAN; or
      the location of the wireless terminal is within the coverage area of the alternate network and the wireless terminal is predicted to leave the coverage area of the WLAN.

6. The method of claim 3, further comprising initiating a handoff of the call from the WLAN to the alternate network before a loss of signal with the WLAN is expected to occur, based on:
   the relative motion of the wireless terminal towards a boundary of a coverage area of the WLAN; and
   physical boundaries that may impede the relative motion of the wireless terminal towards the boundary of a coverage area of the WLAN.

7. The method of claim 3, further comprising predicting if the wireless terminal will leave a coverage area of the WLAN based on previous movements of the wireless terminal relative to the coverage area of the WLAN.

8. The method of claim 7, further comprising servicing the call with the WLAN when the wireless terminal is predicted to stay within the coverage area of the WLAN.

9. The method of claim 1, further comprising comparing signal strengths from a plurality of Access Points (APs) in the WLAN to determine whether to service the wireless terminal with the WLAN or the alternate network.

10. The method of claim 3 further comprising observing the signal strengths over time from a plurality of APs to predict whether the wireless terminal is leaving a coverage area of the WLAN.

11. The method of claim 3, further comprising:
   comparing relative signal quality of the alternate network and the WLAN; and
   choosing to service the call based on relative service quality between a parallel communication path and the WLAN.

12. The method of claim 3, further comprising:
   servicing the call to the wireless terminal via the alternate network when the signal quality of a serving Access Point (AP) fails to meet a first handoff threshold and when signal strengths of all Access Points (APs) in the WLAN are decreasing.

13. A method for servicing communications to a wireless terminal with a wireless local area network (WLAN) and an alternative network, comprising:
servicing a call to the wireless terminal via the WLAN;
determining whether to handoff the call from the WLAN to the alternative network by comparing a call servicing factor of the WLAN and a call servicing factor of the alternative network;
allocating alternative network resources to service the call when the call is to be handed off to the alternative network;
establishing a parallel communication path to the wireless terminal via the alternative network to service the call;
servicing the call to the wireless terminal via the alternative network; and
terminating the communication path between the wireless terminal and the WLAN.

14. The method of claim 13, further comprising:
determining a location of the wireless terminal relative to a coverage area of the WLAN;
determining the location of the wireless terminal relative to a coverage area of the alternative network;
servicing the call with the WLAN when the location of the wireless terminal is within the coverage area of the WLAN; and
servicing the call with the alternative network when the location of the wireless terminal is outside the coverage area of the WLAN but within the coverage area of the alternative network.

15. The method of claim 13, wherein the alternative network comprises a cellular network.

16. The method of claim 13, wherein the alternative network comprises a satellite based network.

17. The method of claim 13, further comprising:
determining a relative motion and location of the wireless terminal relative to a boundary of a coverage area of the WLAN;
determining a relative motion and location of the wireless terminal relative to a coverage area of the alternative network;
servicing the call with the WLAN when the location of the wireless terminal is within the coverage area of the WLAN; and
servicing the call with the alternative network when:
the relative motion of the wireless terminal is towards the boundary of the coverage area of the WLAN; or
the location of the wireless terminal is within the coverage area of the alternative network and predicted to leave the coverage area of the WLAN.

18. The method of claim 13, further comprising initiating a handoff of the call from the WLAN to the alternative network before a loss of signal within the WLAN based on the relative motion of the wireless terminal relative to a boundary of a coverage area of the WLAN.

19. The method of claim 13, further comprising predicting if the wireless terminal will leave a boundary of a coverage area of the WLAN based on previous movement of the wireless terminal relative to the boundary of a coverage area of the WLAN.

20. The method of claim 19, further comprising servicing the call with the WLAN when the wireless terminal is predicted to stay within a coverage area of the WLAN.

21. The method of claim 13, further comprising comparing signal strengths from a plurality of Access Points (APs) in the WLAN to determine whether to service the wireless terminal with the WLAN or the alternative network.

22. The method of claim 13, further comprising observing the signal strengths over time from a plurality of APs to predict whether the wireless terminal is leaving a coverage area of the WLAN.

23. The method of claim 13, further comprising:
comparing relative service quality of the parallel communication path and the WLAN; and
choosing to service the call based on the relative service quality.

24. The method of claim 13, further comprising:
servicing the call to the wireless terminal via the alternative network when the call servicing factor of a serving Access Point (AP) fails to meet a first handoff threshold and when a signal strength of all Access Points (APs) in the WLAN are decreasing.

25. A method for servicing a wireless terminal via a wireless local area network (WLAN) and an alternative network comprising:
servicing a call with the wireless terminal via the alternative network;
determining whether to handoff the call from the alternative network to the WLAN by comparing a call servicing factor of the WLAN and a call servicing factor of the alternative network;
allocating WLAN resources to service the call when the call is to be handed off to the WLAN;
establishing a parallel communication path to the wireless terminal via the WLAN; and
terminating the communication path to the wireless terminal via the alternative network.

26. The method of claim 25, further comprising:
determining a location of the wireless terminal relative to a coverage area of the WLAN;
determining the location of the wireless terminal relative to a coverage area of the alternative network;
servicing the call with the WLAN when the location of the wireless terminal is within the coverage area of the WLAN; and
servicing the call with the alternative network when the location of the wireless terminal is outside the coverage area of the WLAN but within the coverage area of the alternative network.

27. The method of claim 25, wherein the alternative network comprises a cellular network.

28. The method of claim 25, wherein the alternative network comprises a satellite based network.

29. The method of claim 25, further comprising:
determining a relative motion and location of the wireless terminal relative to a boundary of a coverage area of the WLAN;
determining a relative motion and location of the wireless terminal relative to a coverage area of the alternative network;
servicing the call with the WLAN when the location of the wireless terminal is within the coverage area of the WLAN; and
servicing the call with the alternative network when the relative motion of the wireless terminal is towards the boundary of the coverage area of the WLAN and location of the wireless terminal is within the coverage area of the alternative network and predicted to leave the coverage area of the WLAN.

30. The method of claim 25, further comprising initiating a handoff of the call from the WLAN to the alternative network before a loss of signal within the WLAN based on the relative motion of the wireless terminal relative to a boundary of a coverage area of the WLAN.

31. The method of claim 25, further comprising predicting if the wireless terminal will leave a boundary of a coverage area of the WLAN based on previous movement of the wireless terminal relative to the boundary of a coverage area of the WLAN.

32. The method of claim 25, further comprising servicing the call with the WLAN when the wireless terminal is predicted to stay within a coverage area of the WLAN.

33. The method of claim 25, further comprising comparing signal strengths from a plurality of Access Points (APs) in the WLAN to determine whether to service the wireless terminal with the WLAN or the alternative network.

34. The method of claim 25, further comprising observing the signal strengths over time from a plurality of APs to predict whether the wireless terminal is leaving a coverage area of the WLAN.

35. The method of claim 25, further comprising:
comparing relative service quality of the parallel communication path and the alternative network; and
choosing to service the call based on the relative service quality.

36. The method of claim 25, further comprising:
servicing the call to the wireless terminal via the alternative network when the call servicing factor of a serving Access Point (AP) fails to meet a first handoff threshold and when a signal strength of all Access Points (APs) in the WLAN are decreasing.

* * * * *